Aug. 7, 1956  A. G. MENTES  2,757,587
SPREADING APPARATUS AND METHOD
Filed Dec. 20, 1949  7 Sheets-Sheet 1
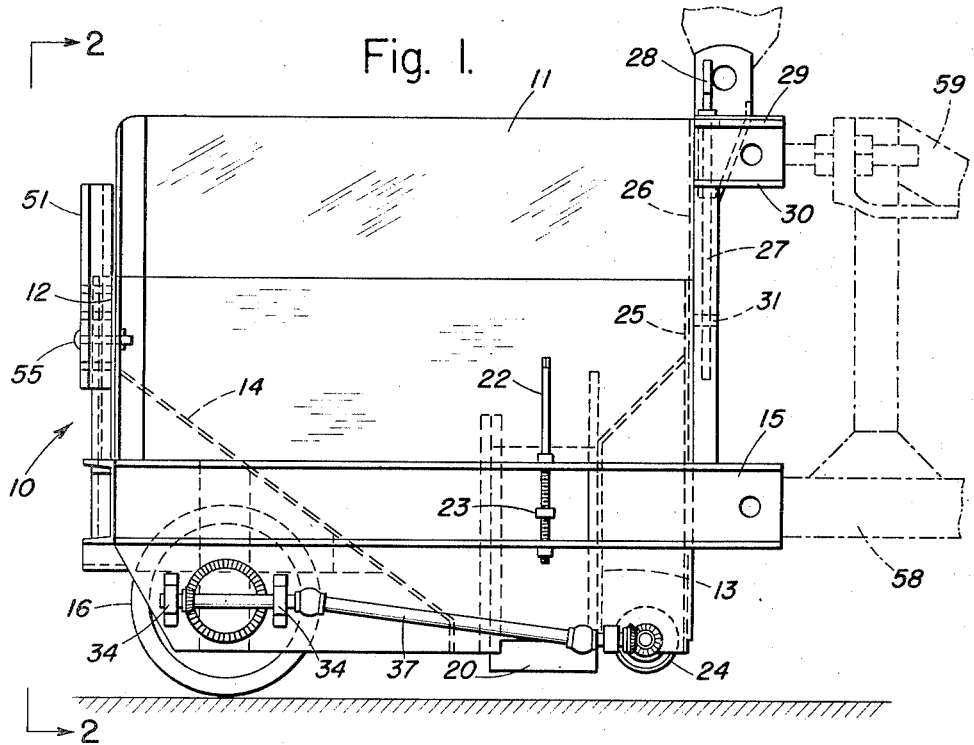
Fig. I.
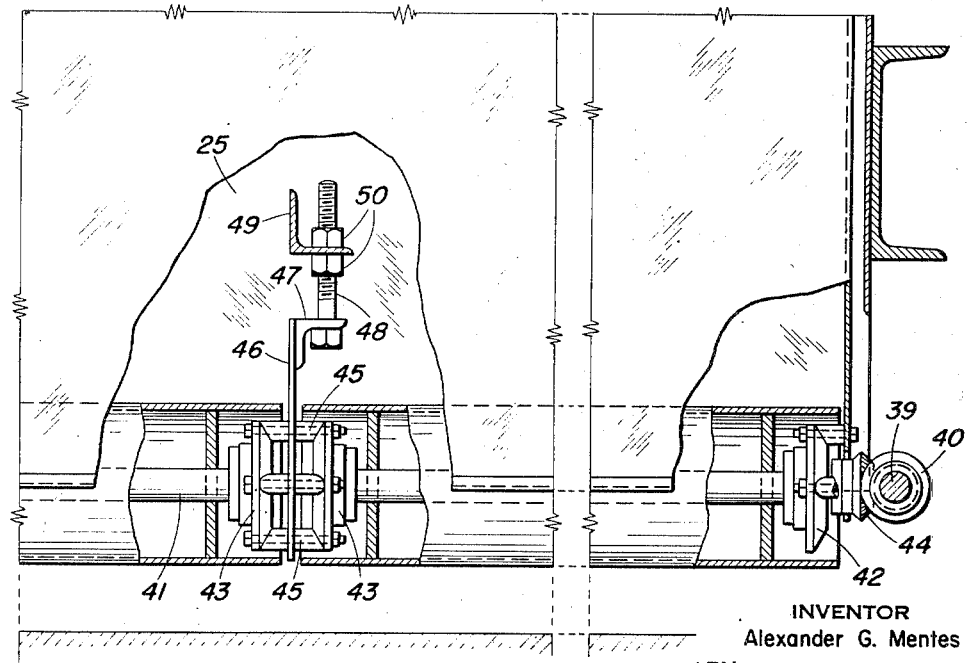
Fig. 8.
INVENTOR
Alexander G. Mentes
BY
Charles F. Kaegebeh
ATTORNEY

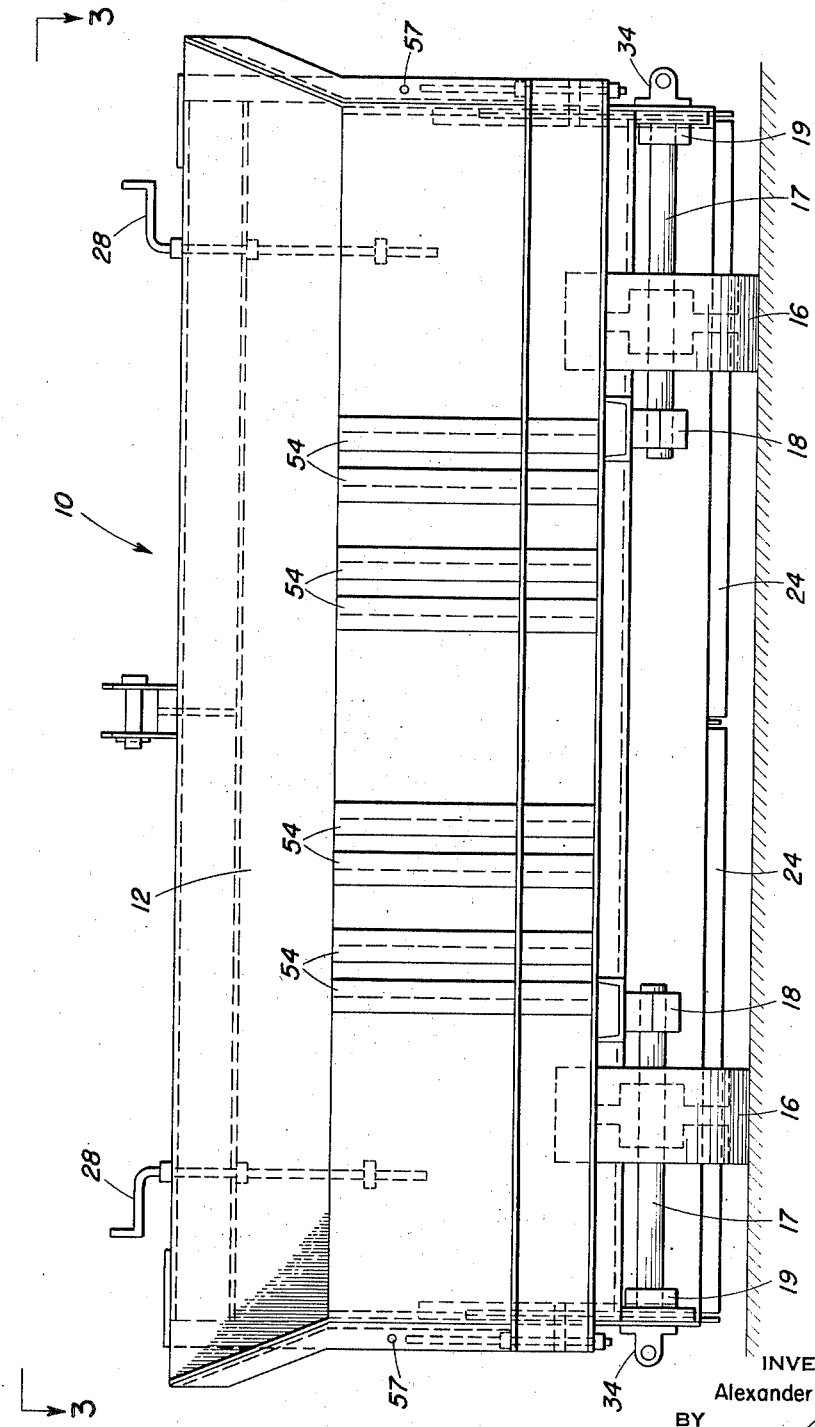

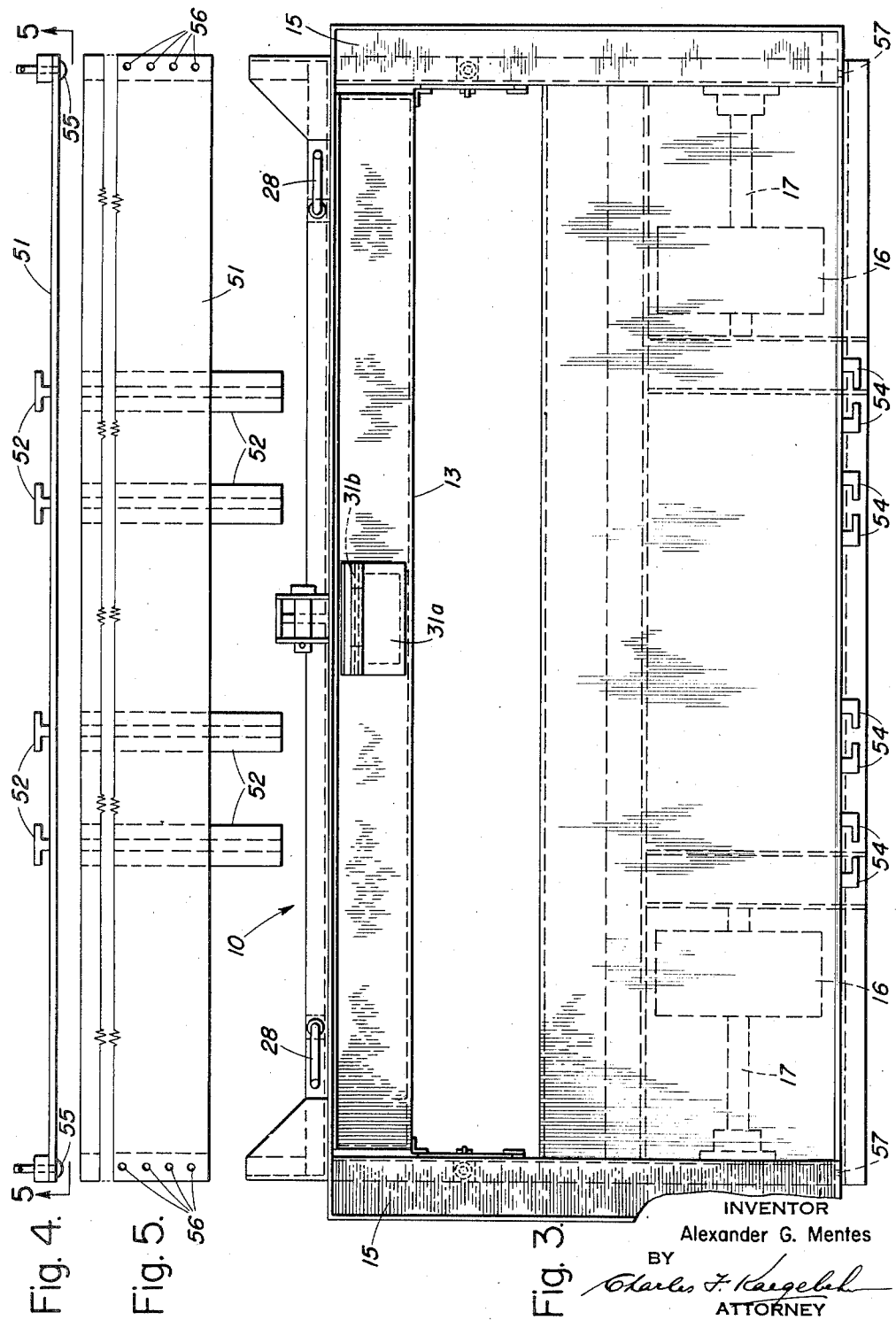

Aug. 7, 1956

A. G. MENTES 2,757,587

SPREADING APPARATUS AND METHOD

Filed Dec. 20, 1949

INVENTOR
Alexander G. Mentes
BY
Charles F. Kaegebehn
ATTORNEY

Aug. 7, 1956   A. G. MENTES   2,757,587
SPREADING APPARATUS AND METHOD
Filed Dec. 20, 1949   7 Sheets-Sheet 5
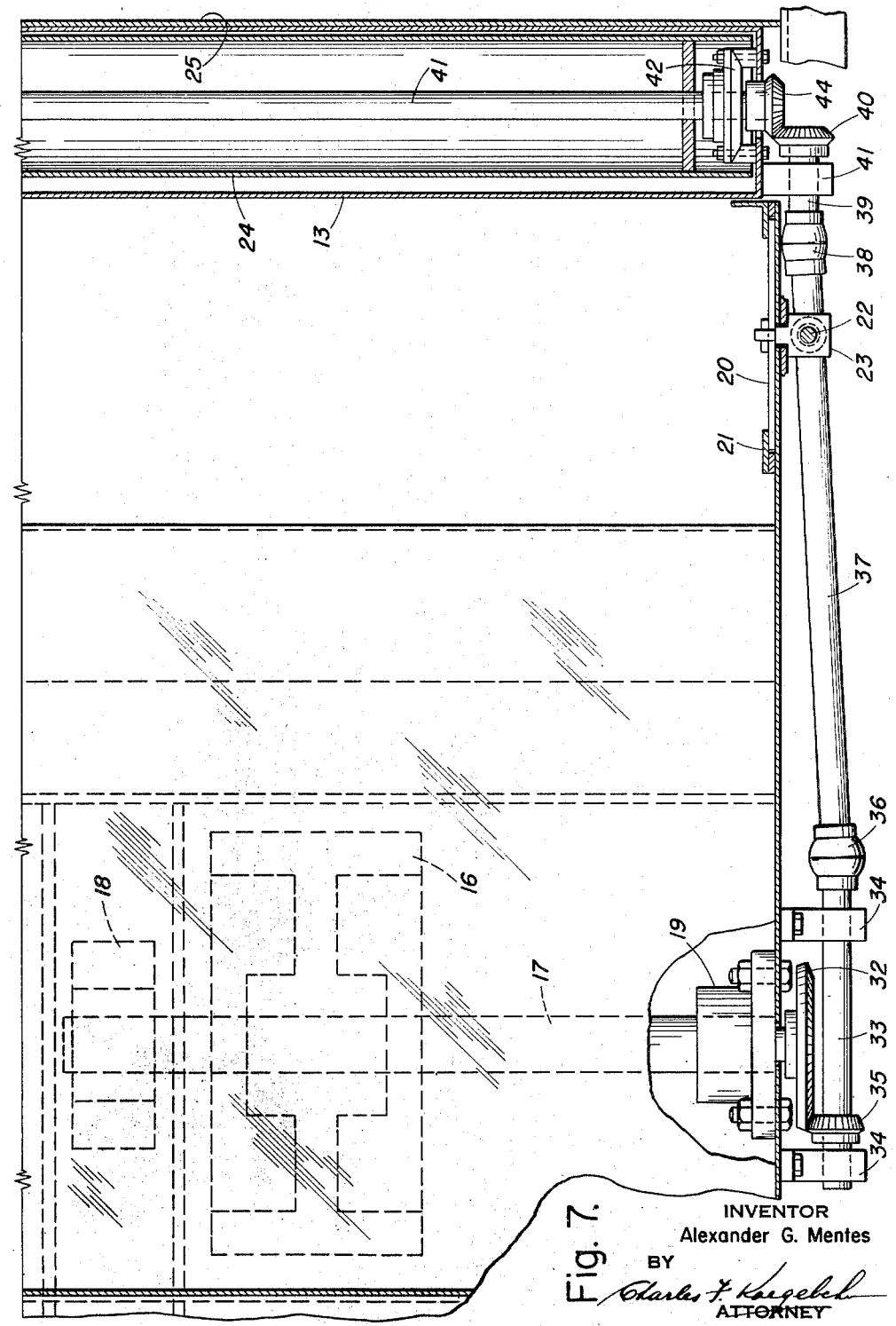

Aug. 7, 1956        A. G. MENTES        2,757,587
              SPREADING APPARATUS AND METHOD
Filed Dec. 20, 1949                    7 Sheets-Sheet 6

INVENTOR
Alexander G. Mentes
BY
Charles F. Kaegebel
ATTORNEY

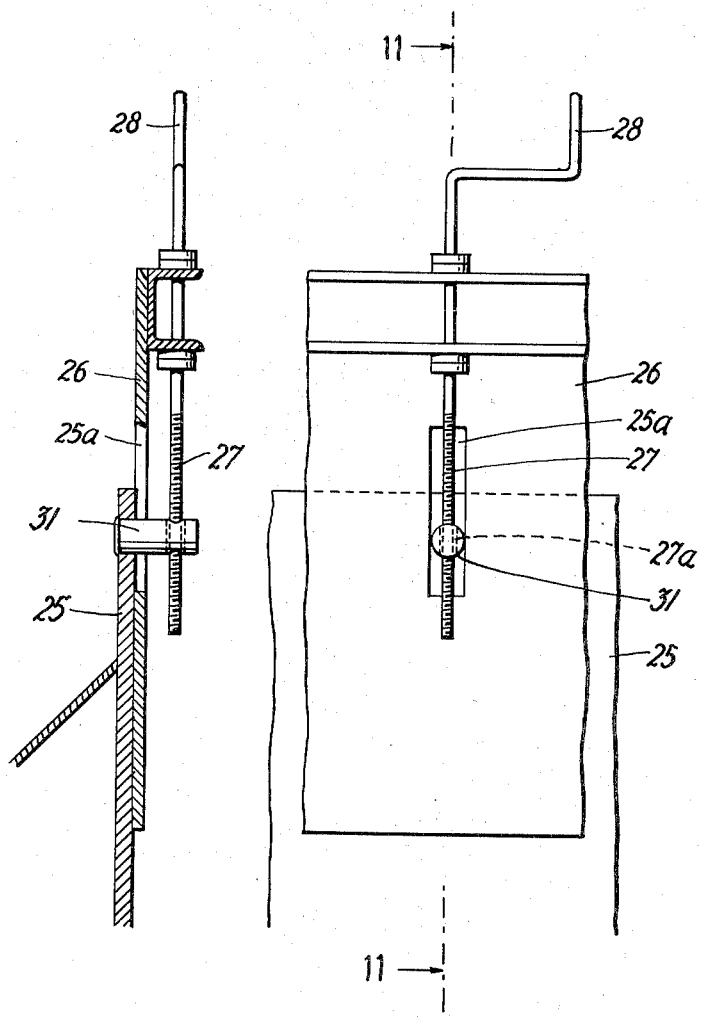

United States Patent Office 2,757,587
Patented Aug. 7, 1956

2,757,587

SPREADING APPARATUS AND METHOD

Alexander G. Mentes, Hasbrouck Heights, N. J., assignor to Mentes-Williams Co., Inc., Hasbrouck Heights, N. J., a corporation of New Jersey Application December 20, 1949, Serial No. 134,003

2 Claims. (Cl. 94—44)

This invention relates to methods and apparatus for spreading loose aggregate, more particularly to methods and apparatus for spreading and distributing relatively finely-divided solid material such as gravel or stone employed in the manufacture of roadways or the like.

In the art of spreading or distributing road building materials, crushed stone or other road constituents are delivered to the working area generally in large dump trucks. The transfer of the stone, for example, from the truck to the road surface to form an even layer of desired thickness over the desired area quickly and efficiently poses a problem which has not been satisfactorily solved by prior art methods and devices. It has been heretofore proposed to attach a spreading hopper at the rear of the dumping truck or to provide a self-propelled spreading hopper moving behind the moving truck with forward motion synchronized therewith. The spreading and even distribution of the dumped stone requires considerable power especially when accomplished at relatively high speeds and such arrangements have not provided the required conditions for efficient and rapid laying and spreading.

It is therefore an object of this invention to provide a method for laying and spreading materials such as crushed stone or the like which will be capable of more rapid and efficient operation than has been possible by heretofore known methods. Another object is to provide spreading apparatus for laying and spreading materials which will be capable of evenly and uniformly spreading crushed stone or the like materials at high rates of speed of operation. Yet another object is to provide a spreading device which will lay and spread materials to provide a more level and uniform layer of such material. Still another object of this invention is to provide a spreading device which will maintain its spreading efficiency while spreading over a curved path and which can readily be adjusted to provide a crowned spread surface. These and other objects will be apparent from the following description of the invention and the drawings annexed hereto.

In its broadest aspects this invention contemplates a method of distributing material such as crushed stone in which a distributing hopper device is mounted at the front of a continuous track propelling vehicle and which hopper abuts against the rear of a stone dump truck. The propelling continuous track vehicle with the attached spreading hopper also propels the dumping truck during the time the crushed stone is being dumped from the truck into the hopper and is spread and levelled onto the roadway under construction. This operation and the details of the novel stone distributing hopper device will be apparent from the annexed drawings in which:

Fig. 1 illustrates a general side view of the spreading device.

Fig. 2 illustrates a front view of the device of Fig. 1.

Fig. 3 illustrates a general top view of the device of Fig. 2.

Fig. 4 illustrates a detailed top view of the bumper attached to the front of the device.

Fig. 5 illustrates a detailed front view of the bumper of Fig. 4.

Fig. 7 illustrates a top view of the device broken out to show details of the driving means also illustrated in Fig. 6.

Fig. 8 illustrates the manner in which the center of the strike-off roller is adjustably supported.

Fig. 10 illustrates a fragmentary rear view of the spreader device.

Fig. 11 illustrates a section therethrough along the line 11—11 of Fig. 10.

Figure 6:
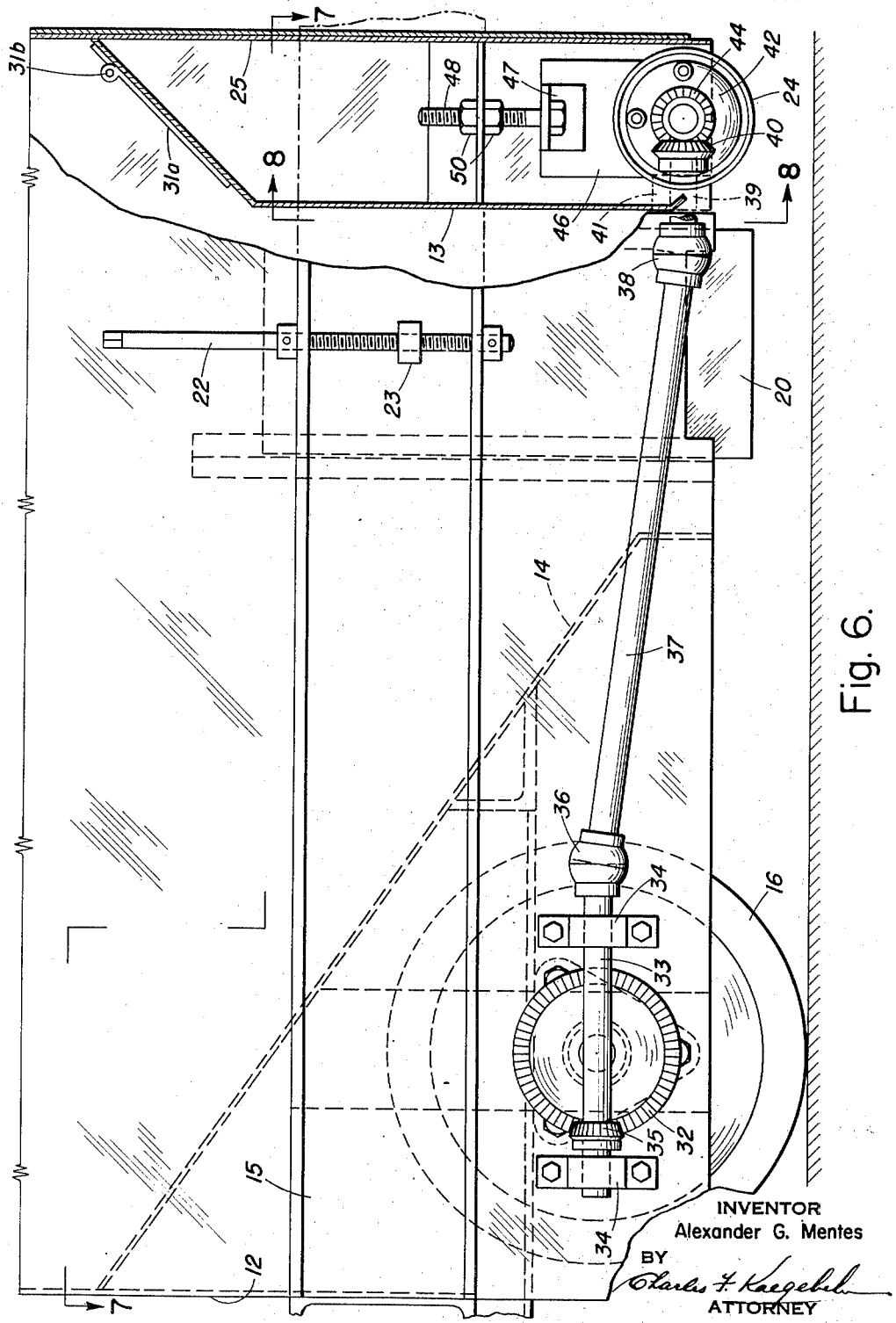
Fig. 6 illustrates a side view of the device of Fig. 2 broken out to show details of the strike-off roller driving means.

Referring now particularly to Figs. 1, 2 and 3, the spreader device shown generally at 10 constitutes a hopper having sides 11, front 12 and back plate 13. The bottom plate 14 is set at an angle substantially as shown to provide a hopper opening between the bottom and the back plate for the passage of crushed stone or other material. The sides of the device are reinforced by provision of longitudinal channel pieces 15. The front of the device is supported by a pair of wheels 16 independently mounted on axles 17 which are in turn conveniently mounted underneath the body of the hopper, as for example, by provision of bearings 18 and 19. The wheels are fixed on the axles which revolve in the bearings for reasons hereinafter explained in detail.

Side gates 20 are provided at each side of the hopper opening to control the flow of material from the side edges of the hopper opening and are vertically slidably mounted in slots 21 in the sides of the hopper. Vertical adjustment of these gates is controlled by provision of adjusting screws 22 mounted through the channels 15 with traveller 23 threaded thereon connected through a slot to the gate 20 substantially as shown.

Material discharged from the open bottom of the hopper is controlled, levelled and evened by the action of "strike-off" means which comprise rollers 24. These elements are formed as two independently rotatable cylindrical segments transversely mounted at the rear of the device and with each section provided with independent driving means actuated by rotation of the wheel on the corresponding side of the device, as will hereinafter also be described in more detail.

The rollers 24 are mounted in an assembly which includes plate 13 in such manner that their height above the normal ground level may be adjusted to provide a strike-off to the desired thickness of spread material. This is accomplished, in the embodiment shown, by providing vertical supporting member 25 which is attached as shown to plate 13 and is slidably mounted in slots 25a in the rear frame plate 26 by means of travellers 31 which extend thru the slots 25a and hold the plate 25 against the rear frame plate 26. The height of the strike-off roller assembly is regulated by adjusting screws 27 which extend through threaded bores 27a in travellers 31 and which terminate at their upper ends in handle portions 28 and which are conveniently mounted on the rear frame through cross members 29 and 30. Threaded traveller 31 on screw 27 is fixedly attached to plate 25 through the conveniently located slots 25a in rear frame plate 26. Access, from the top, to the space between the plates 13 and 25 may be had by swinging cover 31a (Figs. 3 and 6) on its hinge 31b.

The strike-off rollers are rotated by means connected with the wheels 16 which, in the embodiment illustrated, comprise bevel gears 32 which are fixedly attached to the projecting outer extremities of axles 17. Jack shafts 33 are conveniently longitudinally mounted on the sides of the device, as by bearings 34, and fixed on these are bevel gears 35 arranged to mesh with the axle gears 32. The rear end of jack shaft 33 terminates in universal joint 36 which is in turn connected conventionally to drive shaft 37. The rear end of drive shaft 37 is coupled through another universal joint 38, to short shaft 39 to which is fixed at its rear extremity bevel gear 40. The short shaft 39 is suitably supported as by bearing 41 conveniently attached to the strike-off roller assembly frame.

The strike-off roller segments 24 are fixedly attached to transverse axles 41 which are supported at or near each end by bearings of the self-aligning type 42 and 43. The outer bearings are attached to a suitable member of the strike-off roller assembly substantially as shown and the projecting portions of axles 41 are fitted with bevel gears 44 arranged to mesh with the shaft gears 40. Inner bearings 43 are spaced apart slightly and are attacked fixedly together and supported as a unit by provision of attaching members 45 which are bolted to supporting plate 46. At upper extremity plate 46 is provided with angle piece 47 through the horizontal section of which passes bolt 48. A corresponding angle piece 49 is rigidly attached, as by welding, to the vertical supporting member 25 as shown and bolt 48 passes through the horizontal section thereof and may be adjustably fixed in relation thereto by provision of locking nuts 50. Thus by adjustment of nuts 50 on bolt 48, the center of the strike-off rollers may be elevated slightly with respect to the ends to form a very shallow inverted V form so that the action of the roller segments will strike off the spread material to conform to the crown desired. The vertical adjustment necessary will not be great and the subsequent misalignment of axles will be of a magnitude which can readily be accommodated by self-aligning bearings 42 and 43.

The unique operation of the spreading device described involves severe impacts and stresses on the front of the device where it contacts the rear of the dump truck frame. These effects are counteracted by provision of an adjustable bumper 51 which comprises, as shown in Figs. 4 and 5, essentially a heavy flat plate provided with a series of T-shaped vertical reinforcing bars 52 extending advantageously as shown somewhat below the bottom of the bumper plate proper and attached to the rear thereof. The front of the spreader device is provided with a series of vertical angle members 54 welded or otherwise attached thereto arranged substantially as shown to form slots corresponding to the T section bars, and with which they can mate. With the T section bars engaged in the slots the bumper will be firmly held, but capable of vertical adjustment to allow for proper abutment against the rear frames of various dump trucks. After the vertical adjustment has been made, the bumper position may be fixed by engaging pins 55 through suitable holes 56 in the edges of the bumper plate into holes 57 in the spreader front plate or other convenient fixed part.

Figure 9:
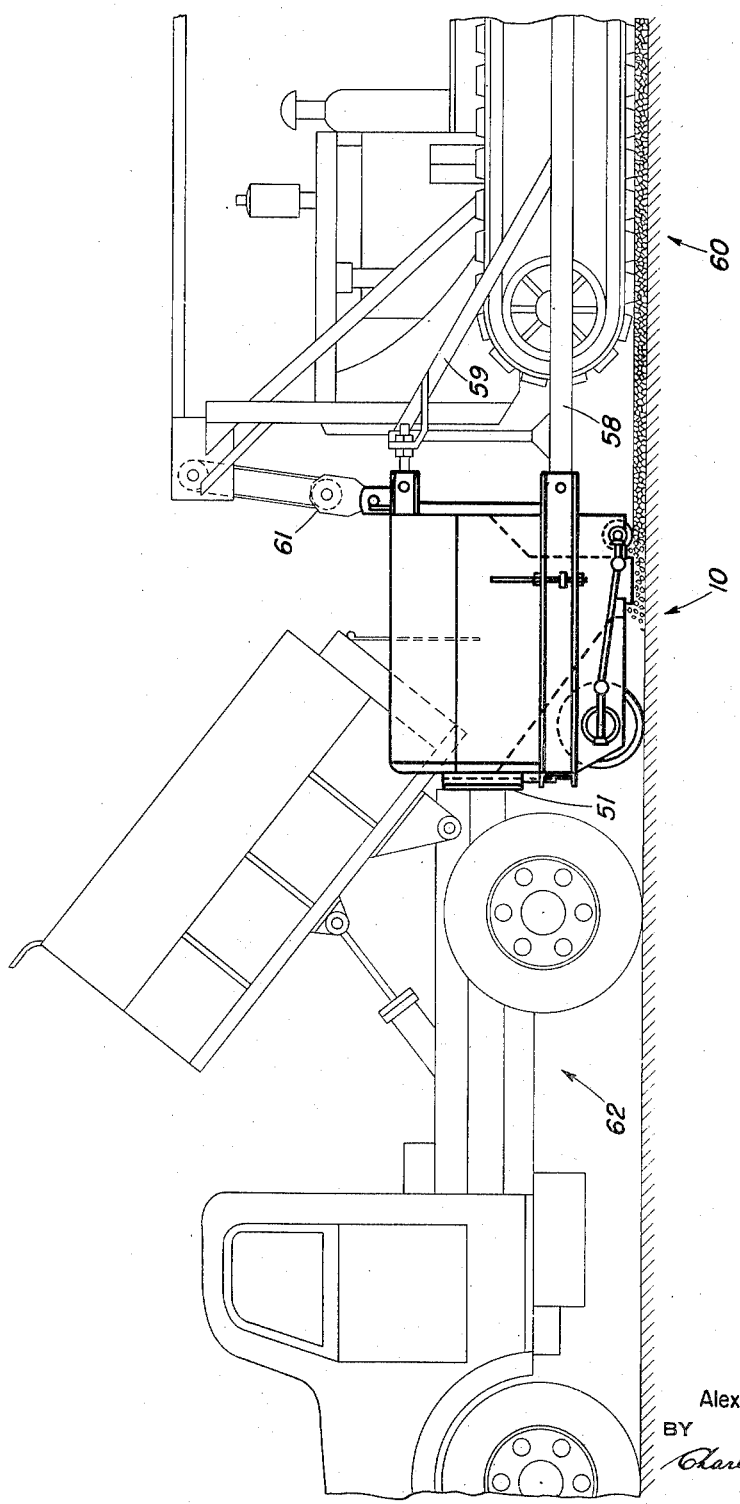
Fig. 9 illustrates the spreader device of this invention and the auxiliary equipment as employed to lay and spread stone.

The method for spreading materials employing the spreader as described is more particularly illustrated in Fig. 9. The spreading device 10 is attached, as by suitable arms 58 and 59, to the front of an endless track tractor, of the type commonly referred to as a caterpillar tractor, indicated generally at 60. The connecting members may if desired be pivotally attached to the tractor and provided with lifting mechanism, such as pulley assembly 61 by which the spreading device may be lifted to clear the ground for transportation into position for use. In laying stone or other material a load of such material, in a conventional dump truck 62, is arranged in position with the rear of its frame abutting against the bumper on the front of the spreader 10. The motor of the truck is then disconnected from its driving wheels and the mechanism actuating the dumping of the body is engaged. This causes crushed stone or other material to be dumped from the truck body into the open hopper of the spreader device. At the same time, the tractor is started and moves forward at a rate suffiicent to insure proper distribution and spreading from the hopper. During the spreading operation, the truck does not employ its own power for propulsion but is pushed by the tractor acting generally through the attaching members 58 through the reinforced body of the hopper to the bumper on the front of the spreading device which abuts against the rear of the frame of the truck. Thus the truck is automatically maintained in the proper position to supply material to the hopper of the spreading device.

The dumping mechanism on the truck is actuated so that the material is dumped into the hopper of the spreader at a rate at least as great as the spreading capacity of the device and not so great as to overflow the spreader hopper. Other than controlling the dumping mechanism, the truck driver does nothing but keep his truck properly aligned in the direction in which the stone is being laid.

Employment of an endless track caterpillar type propulsion source is essential since wheeled tractors will not provide sufficient traction to move the hopper, with its load, and also the truck in front of the spreader. The freshly laid gravel, stone or other material will not provide as hard and tractive a surface as an ordinary road, for instance, and more traction is required than can be obtained by the limited road contact of wheeled motive power devices. Under some conditions, it may be necessary to equip the tractor track with pads or auxiliary gripping bars so that the sufficient traction may be obtained to make possible attainment of extreme spreading speed.

While Fig. 9 illustrates the spreader device of this invention and the auxiliary equipment as employed to lay and spread stone, it will be apparent to those skilled in the art that other methods of attaching the spreading device to the front of a tractor may be employed. Different arrangements may be necessary to attach various kinds and manufactures of endless track tractors which can be utilized in the method of this invention.

The stone laying and spreading operation according to this invention is capable of remarkable capacity. For example, a 90 H. P. tractor operating in conjunction with a spreading hopper of about three cubic yards capacity has demonstrated the ability to lay and spread evenly a 16 ton truck load of crushed stone in one minute. This is equivalent to a theoretical spreading capacity of almost 1000 tons per hour limited only by the ability to move fresh loads of stone into position for dumping.

There is provided a segmented roller for striking off and levelling and evening the spread material. This strike-off device replaces the screen or levelling blade heretofore employed and provides a rolling levelling action which does not tend to tear or scrape and roughen the spread surface even at high operative speeds. Provision of an adjustable central support for the roller axles makes possible regulation of the alignment of the roller segments so that the bottom roller surface can conform to the crown or top curvature of the road. While it is evident that the adjustment described and illustrated cannot produce a geometrically perfect arcuate spread surface, the effect obtained is completely satisfactory. It will be apparent that several passes of the stone laying apparatus will be necessary to spread the stone or other material over the full width of the road and the series of relatively flat transverse sections produced will conform very closely to the desired crown or transverse curvature.

In addition, each segment of the centrally split roller is driven independently by the wheel on the corresponding side of the device. Such an arrangement compensates for the difference in driving effect produced by each wheel when travelling around a curve and contributes substantially to the ability of the device to lay and spread stone evenly and efficiently under all conditions normally encountered.

It is to be understood that the description and drawings illustrate a preferred embodiment of this invention and that variations and modifications within the skill of the art may be made without departing from the spirit thereof. For example obvious modifications of the means for driving the strike-off rollers may be utilized and if desired, the spreading device wheels may be castered to permit greater turning freedom. Other modifications and variations may be employed with the scope of the following claims.

I claim:

1. The method of spreading loose and uncohered aggregate which comprises associating with a dump truck a box-spreader; propelling the spreader and, by it, the truck through the medium of a propulsive vehicle having substantially horizontal longitudinal tractive surfaces in the direction of movement; dumping the loose aggregate from said truck into said spreader as the truck, spreader, and propulsive vehicle move forwardly in the order named; and discharging freely and without obstruction from the bottom of the spreader the loose aggregate received from the truck so as to distribute the same in a uniform uncohered layer in advance of the propulsive vehicle and in the path of said tractive means to provide a bed of loose aggregate on which said tractive means exerts its tractive action to continue the forward movement of the truck, spreader, and propulsive vehicle.

2. Apparatus for spreading loose aggregate comprising an endless-track tractor, a spreader connected with said tractor forwardly thereof, a bumper on the forward end of said spreader for engaging a dump truck, a hopper in said spreader having front, rear, and side walls and an open top and an open front portion above said bumper and said front wall and between said side walls for receiving the dumping body of a truck engaged thereby, whereby loose aggregate is delivered from said truck to said hopper, said hopper having an unobstructed bottom discharge opening through which the aggregate is discharged freely by gravity from the hopper onto a subgrade surface, and strike-off means mounted on said spreader at the rear of said bottom opening and in advance of said tractor for controlling the spreading of the loose aggregate discharged through the hopper opening without exerting on the discharged material compacting downward pressure to establish a tractive bed of loose aggregate on which the tractor may run.

References Cited in the file of this patent
UNITED STATES PATENTS

| | | |
|---|---|---|
| 1,100,990 | Rhodes | June 23, 1914 |
| 1,416,786 | Butler | May 23, 1922 |
| 1,736,413 | Lichtenberg | Nov. 19, 1929 |
| 1,755,653 | Koehring | Apr. 22, 1930 |
| 2,003,186 | Glasser | May 28, 1935 |
| 2,092,458 | Krout | Sept. 7, 1937 |
| 2,109,020 | Abernathy | Feb. 22, 1938 |
| 2,116,504 | Arndt | May 10, 1938 |
| 2,245,426 | Baker | June 10, 1941 |
| 2,258,205 | Halvorsen | Oct. 7, 1941 |
| 2,283,455 | Overman | May 19, 1942 |
| 2,303,486 | McConnaughay | Dec. 1, 1942 |
| 2,314,934 | Guernsey | Mar. 30, 1943 |
| 2,351,592 | Barber | June 20, 1944 |
| 2,378,825 | Bumgardner | June 19, 1945 |
| 2,403,820 | Miller | July 9, 1946 |